United States Patent
Kang et al.

(10) Patent No.: US 7,158,153 B2
(45) Date of Patent: Jan. 2, 2007

(54) METHOD AND CIRCUIT FOR ADJUSTING BACKGROUND CONTRAST IN A DISPLAY DEVICE

(75) Inventors: Jae-Sung Kang, Kyunggi-do (KR); Im-Soo Kang, Kyunggi-do (KR); Jae-Bong Choi, Kyunggi-do (KR); Ji-Hyun Lee, Kyunggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 10/404,207

(22) Filed: Mar. 31, 2003

(65) Prior Publication Data
US 2003/0189560 A1    Oct. 9, 2003

(30) Foreign Application Priority Data
Apr. 9, 2002    (KR) ............... 2002-19193

(51) Int. Cl.
*G09G 5/00*    (2006.01)
(52) U.S. Cl. .................. 345/639; 345/640
(58) Field of Classification Search ............ 345/204, 345/214, 690, 639, 640, 207, 699, 77, 36; 348/565, 631; 715/859; 725/40; 359/414; 257/435, 98
See application file for complete search history.

(56) References Cited

U.S. PATENT DOCUMENTS

| | | | | |
|---|---|---|---|---|
| 4,286,293 A | * | 8/1981 | Jablonowski | ............... 348/126 |
| 5,075,766 A | * | 12/1991 | Sendelweck | ............... 348/569 |
| 5,496,106 A | * | 3/1996 | Anderson | ............... 348/255 |
| 5,576,723 A | * | 11/1996 | Asprey | ............... 345/3.1 |
| 5,729,248 A | | 3/1998 | Hwang | |
| 6,542,622 B1 | * | 4/2003 | Nelson et al. | ............... 382/112 |
| 6,919,929 B1 | * | 7/2005 | Iacobelli et al. | ............... 348/589 |

FOREIGN PATENT DOCUMENTS

| | | |
|---|---|---|
| EP | 0856829 A2 | 8/1998 |
| JP | 04014965 | 1/1992 |
| JP | 2002-064707 | * 2/2002 |
| KR | P2000-0075867 | 12/2000 |

OTHER PUBLICATIONS

English language abstract of Korean Publication No. P2000-0075867.
English language abstract of Japanese Publication No. 04014965.

* cited by examiner

*Primary Examiner*—Richard Hjerpe
*Assistant Examiner*—Abbas Abdulselam
(74) *Attorney, Agent, or Firm*—Marger Johnson & McCollom PC (57) ABSTRACT

A method for adjusting the contrast of a background region in a display device is provided. A video signal for a background region is received in a background region mode. The gain of the video signal is adjusted responsive to a background region control signal thereby adjusting the contrast of the background region. The result is a high quality display device.

17 Claims, 9 Drawing Sheets

METHOD AND CIRCUIT FOR ADJUSTING BACKGROUND CONTRAST IN A DISPLAY DEVICE

This application claims priority from Korean Patent Application No. 2002-19193, filed Apr. 9, 2002, the contents of which are hereby incorporated by reference in their entirety.

BACKGROUND OF THE INVENTION

1. Field of the Invention

The present invention relates to a computer system and, more particularly, to a method and circuit for adjusting the background contrast in a display device.

2. Description of the Related Art

In general, a television is designed to display low resolution images while a display device, e.g., a computer monitor, is designed to display high resolution images. A television displays moving images while a computer monitor, e.g., a color display tube (CDT), displays still images or text. Multimedia data may include text, photographs, moving images, and games. A conventional computer monitor is designed to display text images with lower contrast and sharpness than a television screen. Thus, computer monitors do not optimally display moving images.

Typically, a user selects a desired partial screen (hereinafter, referred to as a 'partial region') from the entire screen displayed on a CDT in order to view a moving image. When contrast and sharpness are increased in both a text displaying region and a non text displaying region of a CDT, the text displaying region of a CRT might be physically damaged.

Unlike a television color picture tube (CPT) that displays various moving images by adjusting the contrast and sharpness of a desired partial region, a conventional CDT does not provide the enhanced sharpness and necessary clarity for effectively displaying moving images.

Even if the contrast and sharpness of the partial region are increased, if the contrast of an outer, background, region is high (that is, if brightness of the background region is high), the partial region contrast cannot be decreased.

SUMMARY OF THE INVENTION

It is an object of the present invention to provide method and circuit for adjusting the background contrast in a display device.

A method for adjusting the contrast of a background region in a display device is provided. The method includes receiving a video signal defining a background region, setting a gain of the video signal responsive to a control signal, and adjusting a contrast of the background region after adjusting the gain. The method further includes adjusting the contrast, e.g., decreasing the contrast, of an outer region of the highlighting region responsive to the control signal. Predetermined coordinates define a highlighting region. The predetermined coordinates include top left and bottom right coordinates. The method includes receiving the video signal responsive to a highlighting enable signal and a gating enable signal.

A circuit for adjusting a contrast of a background region in a display device is provided. The circuit includes a transmission circuit and a control circuit. The transmission circuit is adapted to transmit a background video signal indicative of a background region. The control circuit is adapted to adjust a contrast of the background region by adjusting a gain of the background video signal responsive to a background control signal. The control circuit comprises a logic gate adapted to generate a background enable signal by logically manipulating a highlight enable signal and a gating enable signal. The control circuit comprises a selection circuit adapted to select between a highlight mode and a background mode and is adapted to adjust a contrast of the background region when the highlight mode is selected and adapted to adjust a contrast of a highlight region when the background mode is selected. The control circuit is adapted to adjust a sharpness of the background region when the highlight mode is selected and adapted to adjust a sharpness of the highlight region when the highlight mode is selected. The control circuit is adapted to adjust the contrast of the background region when a background enable signal is active. The control circuit is adapted to adjust the contrast of the highlight region when a highlight enable signal is active.

BRIEF DESCRIPTION OF THE DRAWINGS

The above object and advantages of the present invention will become more apparent by describing in detail preferred embodiments thereof with reference to the attached drawings.

DETAILED DESCRIPTION OF THE INVENTION

Embodiments of the present invention will now be described with reference to the attached drawings. Same reference numerals in different drawings represent the same or similar elements.

Figure 1:
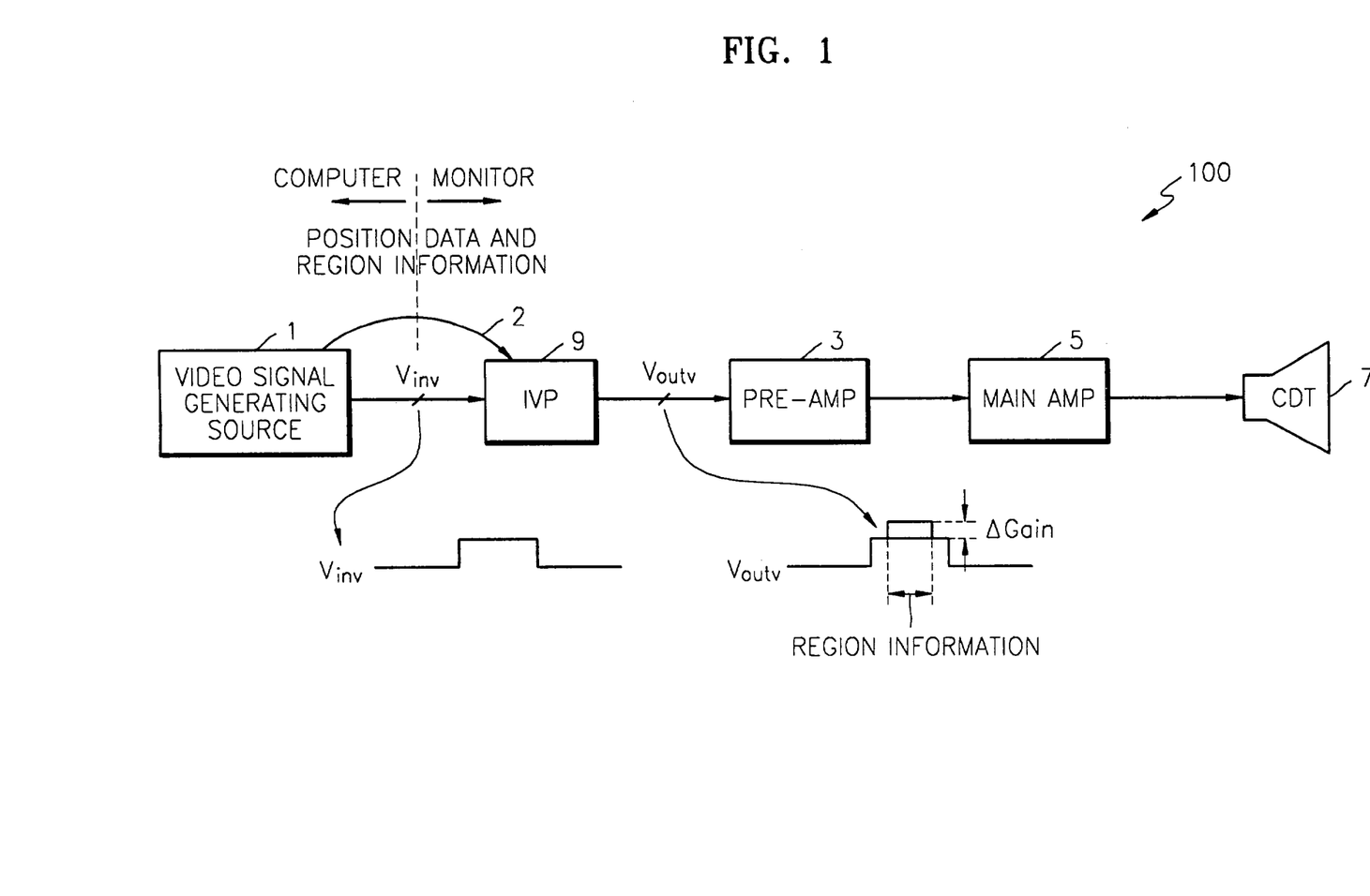
FIG. 1 is a block diagram of a computer system including a contrast adjusting circuit according to an embodiment of the present invention.

FIG. 1 is a block diagram of a computer system 100 that includes a contrast adjusting circuit according to an embodiment of the present invention. Referring to FIG. 1, the computer system includes a computer and a monitor. The computer includes a video signal generating source 1. The monitor includes a contrast adjusting circuit 9, a pre-amplifier (pre-amp) 3, a main amplifier (main amp) 5, and a color display tube (CDT) 7.

The video signal generating source 1 generates video signals, i.e., red, green, and blue (R/G/B) signals and provides the R/G/B signals (Vinv) to the contrast adjusting circuit 9.

A peripheral circuit (not shown) attached to the computer generates position data 2 representing top left and bottom right coordinates and region size of a partial screen (hereinafter, referred to as a 'partial region') selected by a user from the entire screen displayed on the CDT 7. The peripheral circuit provides the position and region data 2 to the IVP 9.

The IVP 9 receives the position and region data 2 and converts it according to the resolution of the CDT 7. The CDT 7 displays the partial region responsive to the position and region data 2 as converted by the IVP 9.

The R/G/B video signals (Vinv) and the position and region data 2, are transmitted to the IVP 9 through a predetermined interface. The predetermined interface may be a serial port, a parallel port, a serial universal bus (USB) port, and the like The Vinv signals may be transmitted to the IVP 9 through one interface and the position and region data 2 may be transmitted to the IVP 9 through the same or a different interface.

The IVP 9 increases or decreases the gain corresponding to the position and region data 2 and outputs a video signal Voutv to the pre-amp 3.

The contrast and/or sharpness of the partial region are increased when the gain of the R/G/B video signals Vinv is increased. The contrast and/or sharpness of the partial region is decreased when the gain of the R/G/B video signals Vinv are decreased.

The pre-amp 3 amplifies the R/G/B video signals Voutv thus adjusting the contrast and sharpness of the partial region. The main amp 5 amplifies the output signal of the pre-amp 3. The CDT 7 displays the video signals received from the main amp 5.

Figure 2:
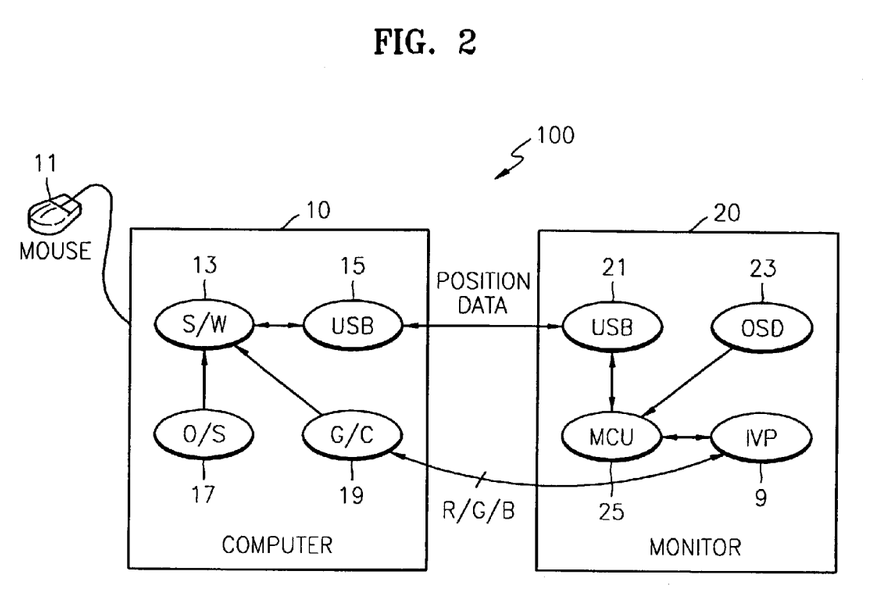
FIG. 2 is a block diagram of the computer system of FIG. 1.

FIG. 2 is a block diagram of the computer system 100 shown in FIG. 1. Referring to FIG. 2, the computer system 100 includes a computer 10 and a monitor 20. The computer 10 is well known in the art and will not be described in any detail.

The computer 10 includes an input device 11, such as a mouse. Software (S/W) 13 sets the partial region and provides a user interface. A universal serial bus (USB) interface 15 for transmits an output signal generated by the S/W 13 to the monitor 20. An operating system (O/S) 17 controls and manages the computer 10. A graphic card (G/C) 19 outputs graphic data from a CPU (not shown) in the computer 10 for displaying on the monitor 20.

The monitor 20 includes a USB interface 21, a main control unit (MCU) 25, an on screen display (OSD) 23, and the IVP 9. The USB 21 is electrically coupled to the USB 15 for transmitting the position and region data generated by the computer 10 to the MCU 25.

The MCU 25 converts the position and region data received from the USB 21 or the OSD 23 into an I2C protocol and outputs the converted position and region data to the IVP 9.

The IVP 9 receives the R/G/B video signals output from the G/C 19 and increases or decreases the contrast and sharpness of the partial region corresponding to the position and region data. This is alternatively referred to as "highlighting".

The IVP 9 according to an embodiment of the present invention may highlight the partial region responsive to user input position and region data generated by the computer 10.

Figure 3:
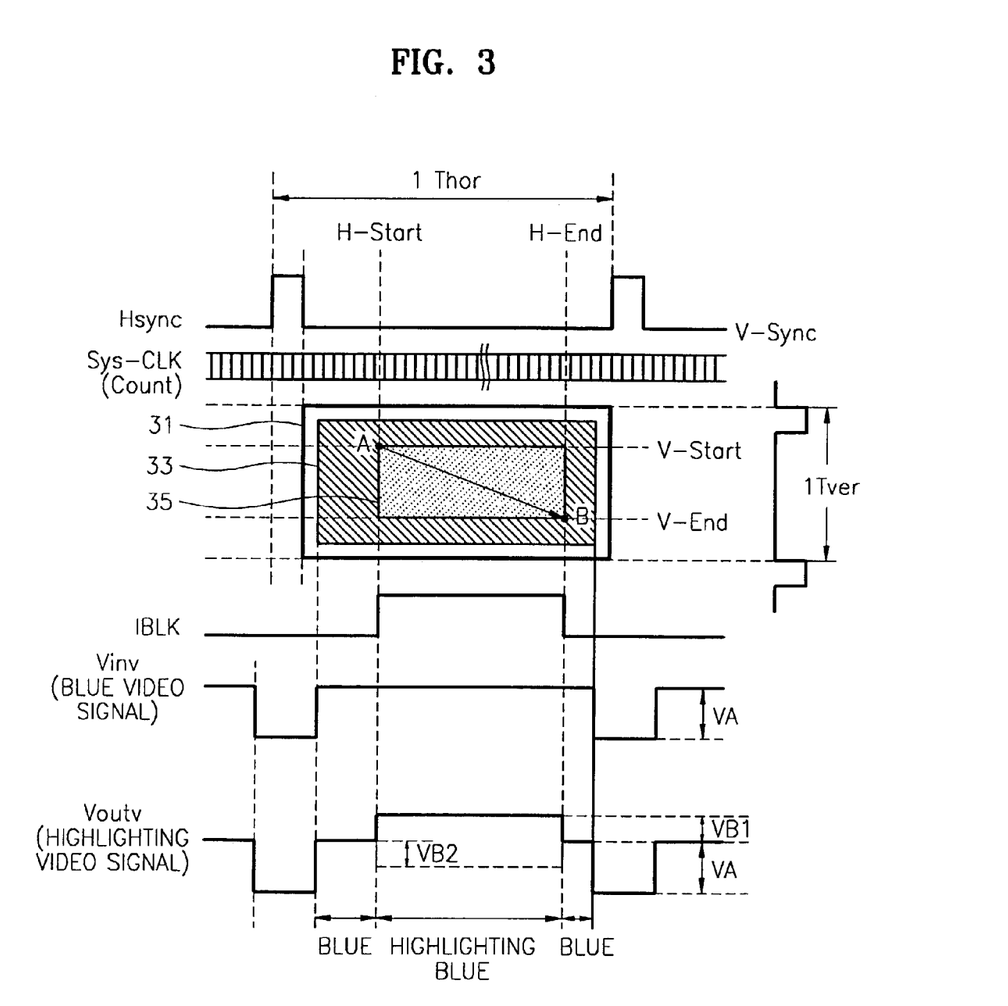
FIG. 3 is a timing diagram highlighting of a partial region when the entire screen of a color display tube (CDT) is displayed in blue.

FIG. 3 is a timing diagram showing highlighting of a partial region when the entire screen of the CDT 7 is displayed in blue. In FIG. 3, it is assumed that the user sets a region 35 to be highlighted in a display portion 33. The display portion 33 is displayed in blue on a CDT display screen 31.

The highlighted region 35 may be set as a rectangle, closed curve circle, or polygon, or any other regular or irregular user selected shape.

The process for highlighting the region 35 in the IVP 9 will now be described with reference to FIGS. 2 and 3. The user sets the region 35 to be highlighted by dragging a mouse from point A (H-Start, V-Start) to point B (H-End, V-End) on the display portion 33 of the CDT display screen 31. In this case, the highlighted region 35 represents the region converted by the IVP 9.

The S/W 13 generates position data representing the top left coordinates corresponding to point A (H-Start, V-Start) and the bottom right coordinates corresponding to point B (H-End, V-End). The S/W 13 also generates the region information identifying the size of the region set by the position data. The position and region data are transmitted to the IVP 9 through an interface, such as the USB interfaces 15 and 21.

The IVP 9 receives the position and region data and counts point A (H-Start, V-Start) and point B (H-End, V-End) from a first edge, i.e., a rising edge of the horizontal synchronizing signal H-Sync or vertical synchronizing signal V-Sync. The IVP 9 generates a highlighting enable signal IBLK, which is activated at point A (H-Start, V-Start) corresponding with the top left coordinates displayed on the CDT display screen 31. The IVP 9 deactivates IBLK at point B (H-End, V-End) corresponding with the bottom right coordinates displayed on the CDT display screen 31. The highlighting enable signal IBLK is thereby activated only in the highlighted region 35.

The IVP 9 increases by VB1 or decreases by VB2 the gain of the blue (B) portion of video signal Vinv during the interval when IBLK is activated, thereby highlighting the region 35.

The IVP 9 receives the blue portion of the video signal Vinv having a peak-peak voltage level VA and increases the gain of the blue signal in the region 35 by VB1. Alternatively, the IVP 9 decreases the blue video signal by VB2, thereby highlighting the region 35. The blue signal in regions other than the region 35, has a peak-peak voltage level VA which is the same as that of the input video signal Vinv. For example, if the peak-peak voltage level VA is 0.714 V, VB1 and VB2 are generated at 5 dB greater and less than the voltage level VA, respectively.

In one embodiment, the horizontal synchronizing signal H-sync is at 20–120 KHz, and the vertical synchronizing signal V-sync is at 50–80 Hz. The system clock Sys-CLK is at 20–125 MHz when the horizontal resolution is 1024.

In one embodiment, a counter (not shown) for counting point A (H-Start, V-Start) and point B (H-End, V-End) is reset on a rising edge of the horizontal synchronizing signal H-sync or the vertical synchronizing signal V-sync.

Figure 4:
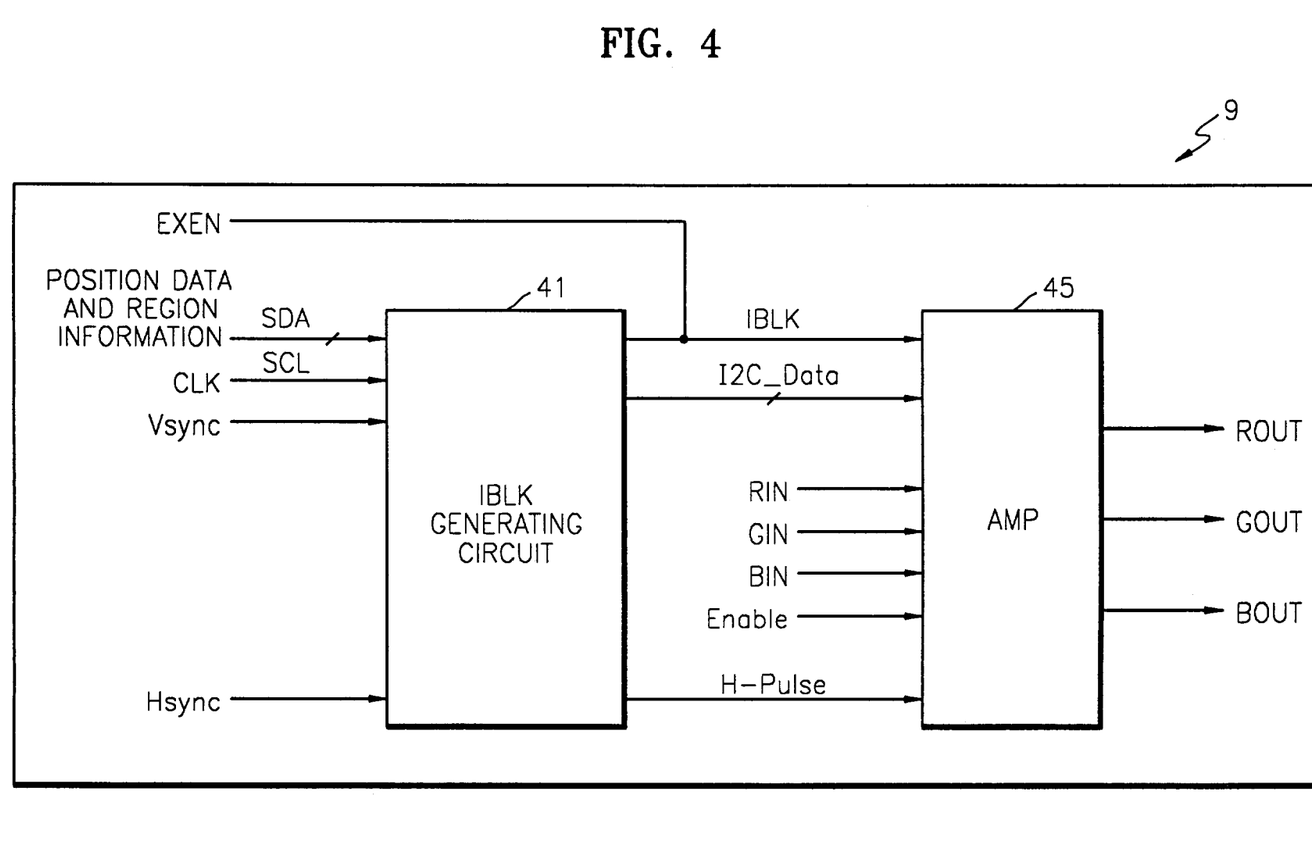
FIG. 4 is a block diagram of a contrast adjusting circuit according to an embodiment of the present invention.

FIG. 4 is a block diagram of a contrast adjusting circuit according to an embodiment of the present invention. The IVP 9 includes a highlighting enable signal IBLK generating circuit 41 and an amplifier (AMP) 45.

The IBLK generating circuit 41 receives position and region data serially through an I²C data line SDA. The highlighting enable signal IBLK and parallel data I2C_Data are output to the AMP 45 responsive to the horizontal synchronizing signal Hsync and the vertical synchronizing signal Vsync. The parallel data I2C_Data represents the position and the region data.

The AMP 45 receives the IBLK signal and the parallel data I2C_Data. The AMP 45 controls the gain and width of the input R/G/B video signals RIN, GIN, and BIN according to the IBLK signal, and outputs the R/G/B video signals ROUT, GOUT, and BOUT with adjusted contrast and sharpness.

Figure 5:
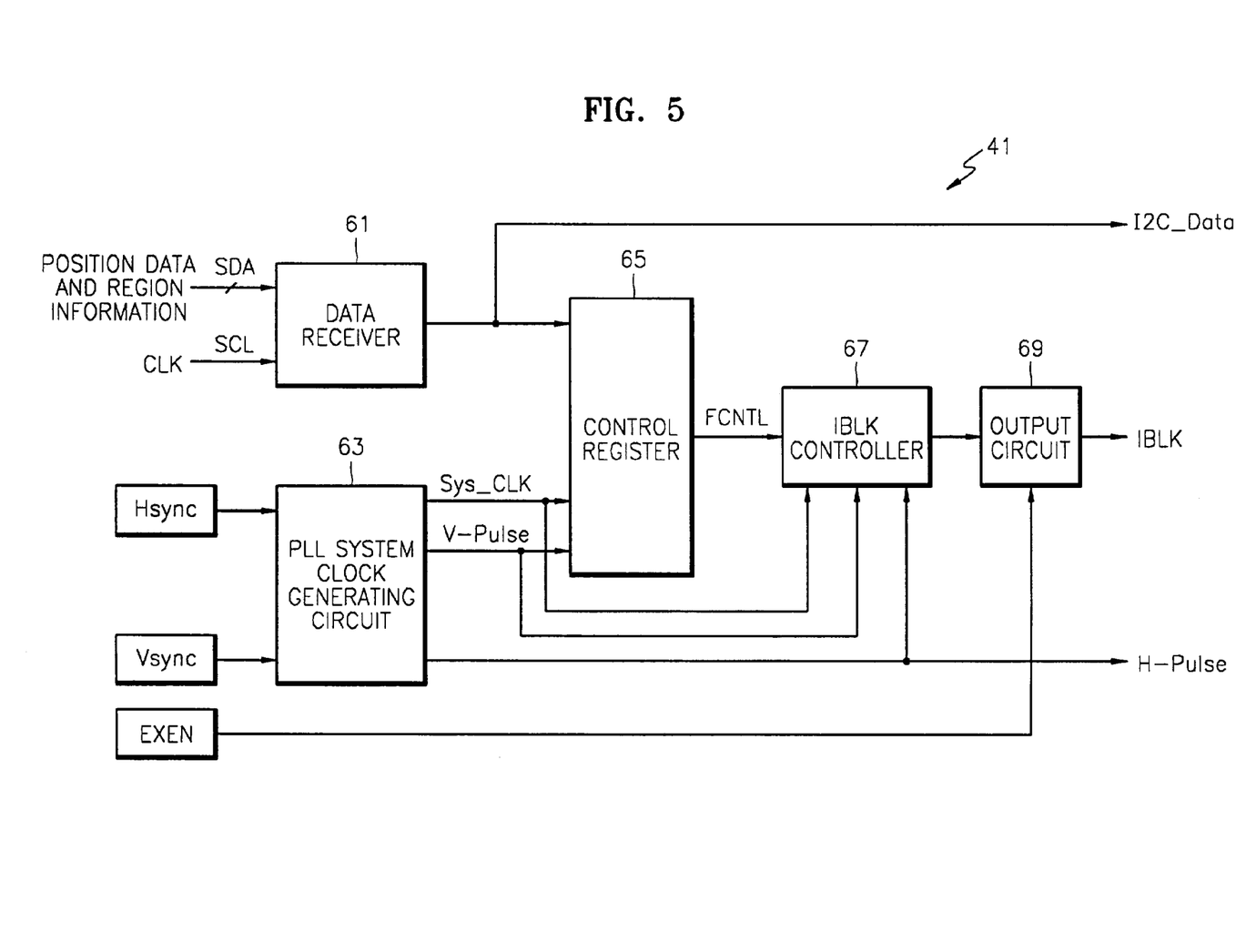
FIG. 5 is a block diagram of a highlighting enable signal IBLK generating circuit shown in FIG. 4.

FIG. 5 is a detailed block diagram of the IBLK generating circuit 41 of FIG. 4. Referring to FIG. 5, the IBLK generating circuit 41 includes a data receiver 61, a PLL system clock generating circuit 63, a control register 65, an IBLK controller 67, and an output circuit 69.

The data receiver 61 receives the position and region data serially through the I2C data line SDA responsive to a clock signal CLK input through an I2C clock line SCL. The data receiver 61 receives the serially input position data and the region information through a decoder (not shown). The data receiver 61 decodes the position and region data from SDA and SCL signals into parallel I2C_Data, and outputs the parallel data I2C_Data to the control register 65 and the AMP 45.

The PLL system clock generating circuit 63 receives the horizontal synchronizing signal H-sync and the vertical synchronizing signal V-sync through a buffer (not shown) and generates a system clock signal Sys-CLK, a vertical pulse V-pulse, and a horizontal pulse H-pulse. The vertical pulse V-pulse is a buffered version of the vertical synchronizing signal V-sync is obtained by buffering the vertical synchronizing signal V-sync in the PLL system clock generating circuit 63. The horizontal pulse H-pulse is a buffered version of the horizontal synchronizing signal H-sync, obtained by buffering the horizontal synchronizing signal H-sync in the PLL system clock generating circuit 63.

The system clock signal Sys-CLK is used for latching the position and region data input through the I2C data line SDA and determines the resolution of the highlighted enable signal IBLK during one horizontal period (1 Thor). In the embodiment, the system clock signal Sys-CLK is the product of the frequency and horizontal resolutions of the horizontal synchronizing signal Hsync.

The control register 65 latches the parallel I2C_Data from the data receiver 61 responsive to the system clock signal Sys-CLK, and outputs the latched parallel data FCNTL while the vertical pulse V-pulse is activated, to the IBLK controller 67.

The IBLK controller 67 includes four 11-bit counters (not shown) and two 9-bit counters (not shown). The IBLK controller 67 generates a highlighting enable signal IBLK activated at point A (H-Start, V-Start) and point B (H-End, V-End) corresponding to the signal FCNTL output from the control register 65 responsive to the system clock Sys-CLK, the horizontal pulse H-pulse, and the vertical pulse V-pulse.

The four 11-bit counters respectively count a horizontal start point (H-Start, V-Start), a horizontal end point (H-End, V-Start), a vertical start point (H-Start, V-End), and a vertical end point (H-End, V-End). The four 11-bit counters receive the position and region data set in the computer 10 and converts the same into a region to be highlighted and displayed on the CDT 7. When the position of the highlighted region displayed on the CDT 7 is moved, the two 9-bit counters respectively count point A (H-Start, V-Start) and point B (H-End, V-End) before movement and the distance by which the point A (H-Start, V-Start) and the point B (H-End, V-End) is moved in horizontal and vertical directions.

The counters for counting the horizontal start point (H-Start, V-Start) and the horizontal end point (H-End, V-Start) are reset on a rising edge of the horizontal synchronizing signal Hsync. The counters divide one period (1 Thor) of the horizontal synchronizing signal Hsync by a predetermined frequency and display coordinates corresponding to the position data and the region information on the CDT 7. The counters used for counting the vertical start point V-Start and the vertical end point V-End are reset on a rising edge of the vertical synchronizing signal Vsync. These counters count the horizontal synchronizing signal Hsync and display coordinates corresponding to the position and region data on the CDT 7.

The output circuit 69 receives the output signal from the IBLK controller 67 or an external enable signal EXEN from outside of the IVP 9. The output circuit 69 outputs the highlighting enable signal IBLK. The external enable signal EXEN is a signal generated in the MCU 25 responsive to the signal output from the S/W 13 or OSD 23. The external enable signal EXEN is used when a nonrectangular partial region is selected by the user. The external enable signal EXEN is activated only in the region to be highlighted.

Figure 6:
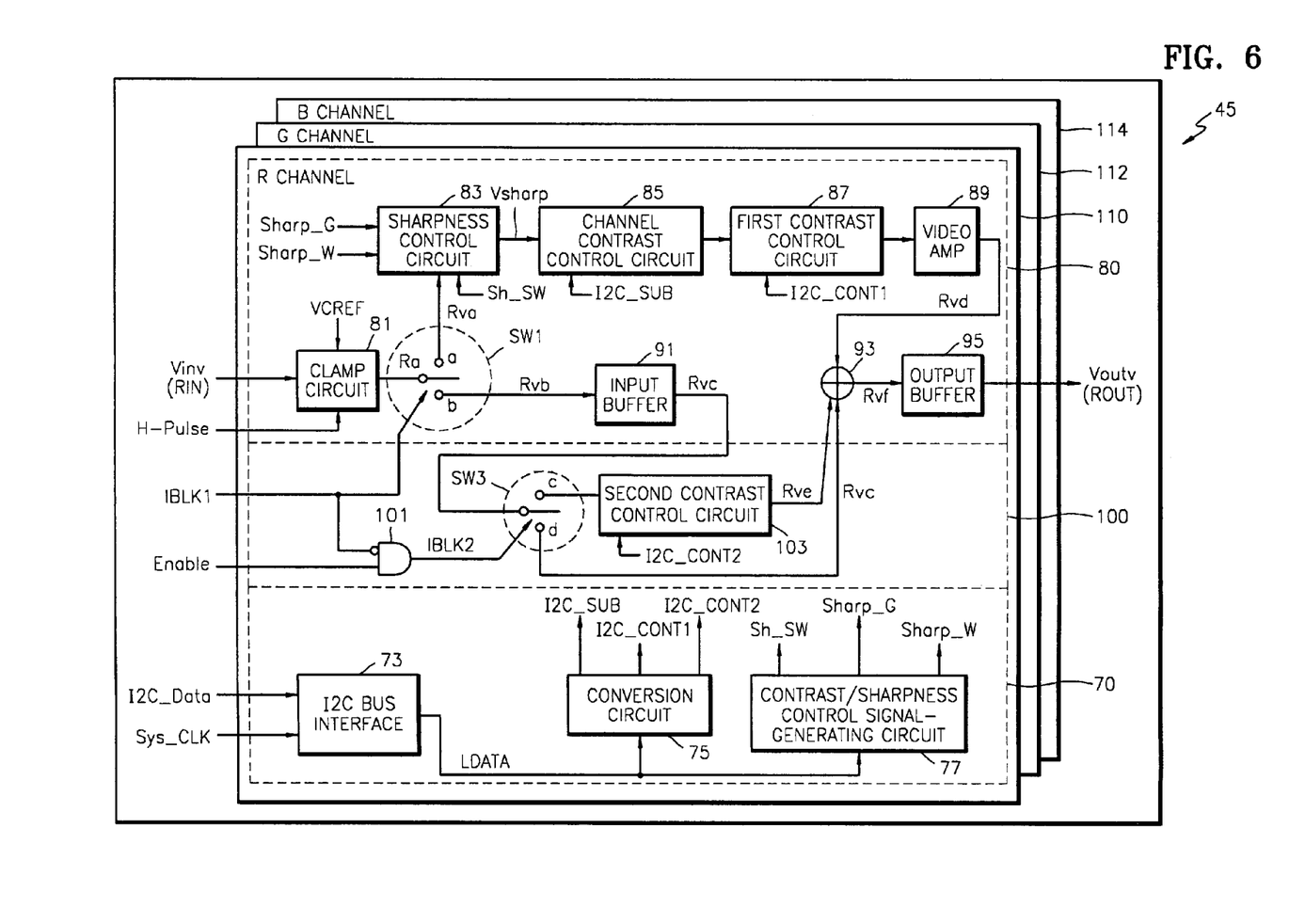
FIG. 6 is a block diagram of an amplifier circuit shown in FIG. 4.

FIG. 6 is a block diagram of the AMP 45 shown in FIG. 4. The AMP 45 includes an R channel amp 110, a G channel amp 112, and a B channel amp 114. For the convenience of explanation, only the R channel amp 110 will be described below.

The R channel amp 110 includes a control signal generating circuit 70, a highlighting region contrast control circuit 80, and a background region contrast control circuit 100. The G and B channel amps 112 and 114, respectively have a similar construction.

The control signal generating circuit 70 includes an I2C bus interface 73, a conversion circuit 75, and a contrast/sharpness control signal-generating circuit 77.

The I2C bus interface 73 receives parallel data I2C_Data output from the data receiver 61 (FIG. 4). The I2C bus interface 73 latches the I2C data and outputs a signal LDATA. The conversion circuit 75 converts the LDATA signal output by the I2C bus interface 73 into an analog current. Preferably, the output signal LDATA is N-bit parallel data.

Figure 7:
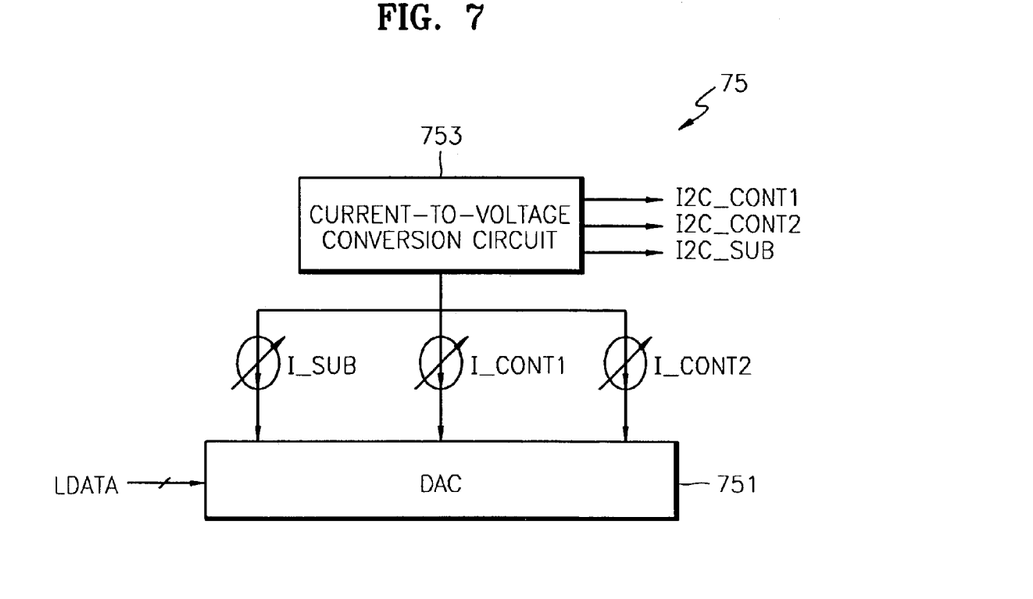
FIG. 7 is a block diagram of a circuit shown in FIG. 6.

FIG. 7 illustrates the conversion circuit 75 shown in FIG. 6 according to an embodiment of the present invention. Referring to FIG. 7, the conversion circuit 75 includes a digital-to-analog converter (DAC) 751 and a current-to-voltage converter circuit 753.

Referring to FIGS. 6 and 7, the digital-to-analog converter (DAC) 751 receives the LDATA signal output by the I2C bus interface 73 (FIG. 6) and generates currents I_SUB, I_CONT1, and I_CONT2, which are proportional to an increase in the output signal LDATA.

The AMP 45 includes a DAC (not shown) for controlling the gain of the video signal for each of the RIG/B channels and N (where N is a natural number) DACs for simultaneously controlling the gain of the video signals of the R/G/B channels.

The current-to-voltage conversion circuit 753 outputs a channel contrast control signal I2C_SUB to a channel contrast control circuit 85 responsive to current I_SUB, and outputs a contrast control signal I2C_CONT1 to a first contrast control circuit 87 responsive to current I_CONT1.

Accordingly, a highlighting region control signal is comprised of the channel contrast control signal I2C_SUB and the contrast control signal I2C_CONT1. For example, the channel contrast control signal I2C_SUB may be proportional to the current I_SUB by $(\tanh)-1$.

The current-to-voltage conversion circuit 753 outputs a background region control signal I2C_CONT2, which is proportional to the current I_CONT2, to a second contrast control circuit 103 (FIG. 6) responsive to the current I_CONT2.

The contrast/sharpness control signal generating circuit 77 receives the LDATA output by the I2C bus interface 73 and outputs a switching signal Sh_SW, a sharpness gain control signal Sharp_G, and a sharpness peak width control signal Sharp_W to a sharpness control circuit 83.

The sharpness gain control signal Sharp_G and the sharpness peak width control signal Sharp_W may have N bits (where N is a natural number). In one embodiment, W is 3 bits.

The gain control circuit 80 includes a clamp circuit 81, the sharpness control circuit 83, a first switching circuit SWI, the channel contrast control circuit 85, the contrast control circuit 87, a video amp 89, an input buffer 91, a mixer 93, and an output buffer 95.

The clamp circuit 81 compares an R video signal RIN input into an R channel with a predetermined reference voltage CVREF, and outputs to the first switching circuit SW1, a video signal clamped in a predetermined range responsive to the comparison.

The clamp circuit 81 performs a sampling using negative feedback during an interval when a horizontal enable signal H-pulse is activated until the low level of the video signal RIN is equal to the predetermined reference voltage VCREF. The clamp circuit 81 outputs the clamped video signal when RIN and VCREF are equal. For example, it is assumed that the reference voltage VCREF is 2V DC and the voltage level of the input video signal RIN is 0.714V peak-to-peak. The clamp circuit 81 performs the sampling until the low level, i.e., 0V, of the inputted video signal RIN reaches 2V during the interval when the horizontal enable signal H-pulse is activated. The voltage level of the signal output by the clamp circuit 81 is 0.714 V peak-to-peak.

The first switching circuit SW1 outputs an output signal Rva of the clamp circuit 81 to the sharpness control circuit 83 or the input buffer 91 responsive to a highlighting enable signal IBLK1. If the highlighting enable signal IBLK is activated (i.e., "high"), the first switching circuit SW1 transmits the output signal Ra from the clamp circuit 81 to the sharpness control circuit 83 through a contact point a. If the highlighting enable signal IBLK is deactivated (i.e., "low"), the first switching circuit SW1 transmits the Ra signal from the clamp circuit 81 to the input buffer 91 through a contact point b.

The input buffer 91 buffers the output signal Ra from the clamp circuit 81 and outputs a buffered signal Rvc to a second switching circuit SW3. In this case, the gain of the input buffer 91 is preferably 0 dB.

The sharpness control circuit 83 adjusts the width and gain of the video signal Rva according to control signals Sharp_G, Sharp_W, and Sh_SW.

Figure 8:
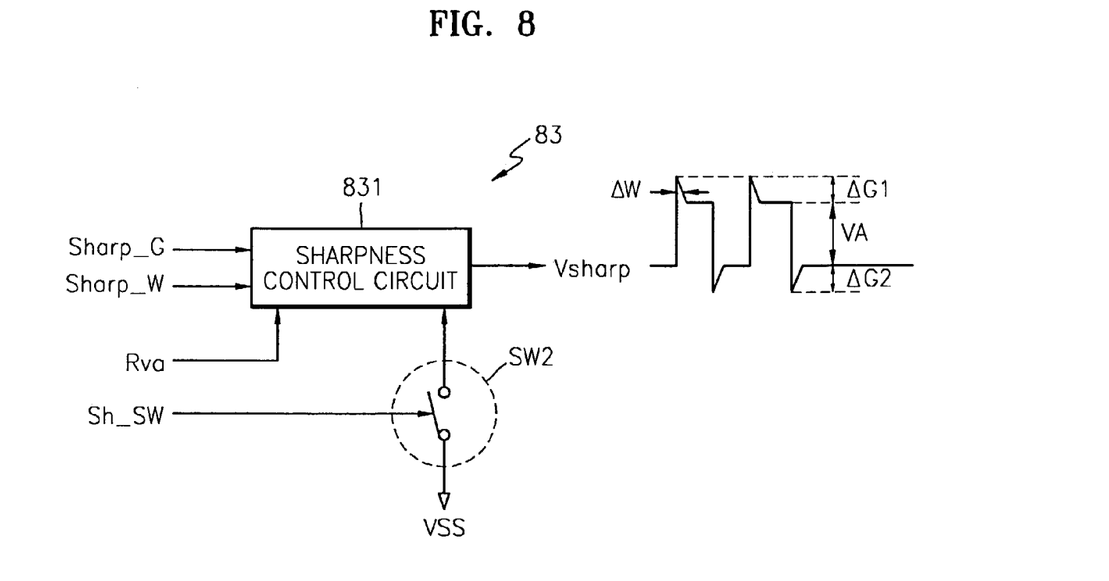
FIG. 8 is a block diagram of a sharpness adjusting circuit shown in FIG. 6.

FIG. 8 shows the sharpness adjusting circuit shown in FIG. 6 and output waveforms of the sharpness adjusting circuit.

Referring to FIG. 8, a control signal Sharp_G controls a peak ΔG1 or ΔG2 of the video signal Rva. A control signal Sharp_W controls a peak width ΔW of the video signal Rva. A third switching circuit SW2 controls the on-off state of the sharpness control circuit 83 in response to a switching signal Sh_SW.

The sharpness control circuit 83 adjusts the gain of the video signal having a peak-to-peak voltage VA within a range of 0–50% responsive to the control signal Sharp_G. The sharpness control circuit 83 adjusts a peak width ΔW having a variable range of 50–300 ns responsive to the control signal Sharp_W. The sharpness of the video signal Rva is adjusted responsive to the control signal Sharp_G and/or the control signal Sharp_W.

The channel contrast control circuit 85 adjusts the gain of the output signal Vsharp for the sharpness control circuit 83 responsive to the channel contrast control signal I2C_SUB. The channel contrast control circuit 85 adjusts the gain of a video signal RIN for only an R channel. The gain for the video signal RIN varied by the channel contrast control circuit 85 has a range of preferably 0–1.5 dB. The channel contrast control circuit 85 is provided for each of the R/G/B channels to control the gain of each of the R/G/B channels.

The contrast control circuit 87 controls the gain of the signal output from the channel contrast control circuit 85 responsive to the contrast control signal I2C_CONT. The contrast control circuit 87 simultaneously controls the gain of video signals for the R/G/B channels responsive to the contrast control signal I2C_CONT. The gain, which is adjusted by the contrast control circuit 87, is preferably 0–3.5 dB. The video amp 89 receives the signal output by the contrast control circuit 87 and amplifies the gain of the video signal for a region to be highlighted by up to 5 dB. A signal Rvd output by the video amp 89 preferably has a range of 0–1.2 Vp-p.

The background region contrast control circuit 100 includes a logic gate 101, a second switching circuit SW3, and a second contrast control circuit 103.

The logic gate 101 generates a background region enable signal IBLK2 responsive to a gating enable signal Enable and an inversed highlighting enable signal IBLK1 and outputs the background region enable signal IBLK2 to the second switching circuit SW3.

The second switching circuit SW3 outputs the output signal Rvc of the input buffer 91 to the second contrast control circuit 103 via a contact point c or to a mixer 93 via a contact point d responsive to the background enable signal IBLK2.

For example, the second switching circuit SW3 outputs the output signal Rvc of the input buffer 91 to the second contrast control circuit 103 via the contact point c responsive to the activated (i.e., "high") background enable signal IBLK2, or to the mixer 93 via the contact point d in response to the deactivated (i.e., "low") background region enable signal IBLK2.

The first switching circuit SW1 and the second switching circuit SW3 may constitute a transmission circuit or switching circuit. The transmission circuit or switching circuit outputs a video signal for the background region to the second contrast control circuit (or control circuit) 103 responsive to the gating enable signal Enable and the highlighting enable signal IBLK1. The second contrast control circuit (or control circuit) 103 controls the gain of the video signal Rvc responsive to the background region control signal I2C_CONT2. Accordingly, the user can adjust the contrast of the background region.

In one embodiment, an output signal of the second contrast control circuit 103 may be varied within the range of 0–0.714 Vpp and contributes to decrease the contrast of the background region.

Consequently, the second contrast control circuit 103 decreases the gain of the video signal Rvc of the background region to highlight the highlighting region.

The mixer 93 mixes the output signal Rvd of the video amp 89 with an output signal Rve of the second contrast control circuit 103, or mixes the output signal Rvd of the video amp 89 with the output signal of the input buffer 91, and outputs the signal resulting from the mixing, i.e., Rvf, to the output buffer 95. The output buffer 95 buffers the output signal Rvf of the mixer 93 and outputs a buffered output signal Voutv(ROUT) to the pre-amp 3 shown in FIG. 3.

Figure 9:
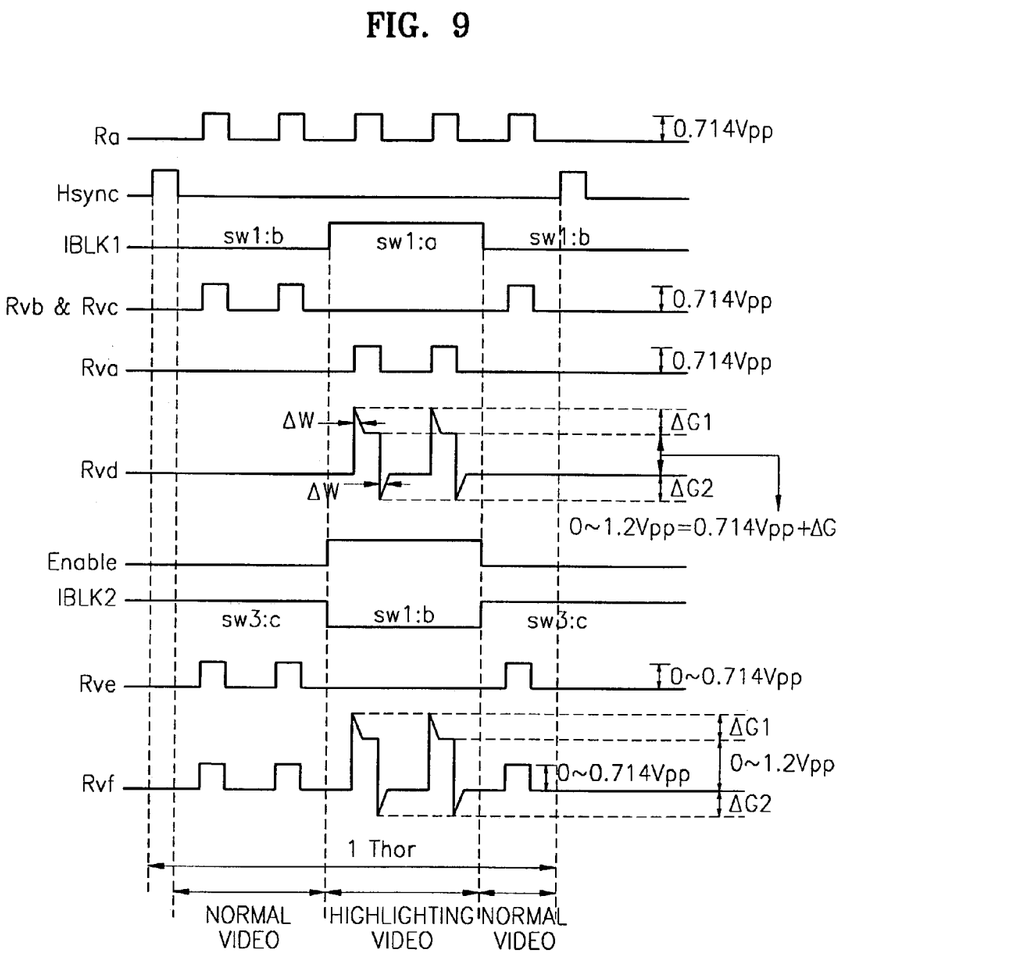
FIG. 9 is a timing diagram showing output waveforms of the amplifier shown in FIG. 6.

FIG. 9 is a timing diagram showing output waveforms of each circuit of the amplifier in FIG. 6. A method for adjusting the contrast and sharpness of the highlighting region and the background region according to an embodiment of the present invention will be described in detail with reference to FIGS. 6 and 9.

As shown in FIG. 3, the highlighting region 35 is set by predetermined coordinates A and B. If the highlighting enable signal IBLK1 is activated (this is alternatively referred to as "highlighting mode"), the first switching circuit SW1 contacts the contact point a.

Thus, the first switching circuit SW1 transmits the output signal Ra of the clamp circuit 81 to the sharpness control circuit 83 only when the highlighting enable signal IBLK is activated.

Thus, the highlighting region contrast control circuit 80 adjusts the contrast and sharpness of the highlighting region 35 shown in FIG. 3 responsive to the control signals Sh_SW, Sharp_G, and Sharp_W and the highlighting region control signals I2C_SUB and I2C_CONT1, and outputs the signal resulting from the adjustment, i.e., Rvd, to the mixer 93.

That is, the control circuits 83, 85, 87, and 89 control the gain, peak, and peak width of the video signal Rva for the highlighting region 35 in response to the control signals Sh_SW, Sharp_G, and Sharp_W and the highlighting region control signals I2C_SUB and I2C_CONT1 shown in FIG. 6. The signal resulting from the control of the control circuits, i.e., Rvd, is output to the mixer 93.

If the highlighting enable signal IBLK1 is deactivated and the background region enable signal IBLK2 is activated (this is alternatively referred to as "background region mode"), the first switching circuit SW1 contacts the contact point b, and the second switching circuit SW3 contacts the contact point c.

Accordingly, the video signal for the background region of a video signal Vinv(RIN) is inputted into the second contrast control circuit 103 via the contact point b, the input buffer 91, and the contact point c.

In the background region mode, the second contrast control circuit 103 may control the contrast of the background region by controlling the gain of the video signal for the background region responsive to the background region control signal I2C_CONT2. Accordingly, the user can adjust the contrast of the background region.

Figure 10:
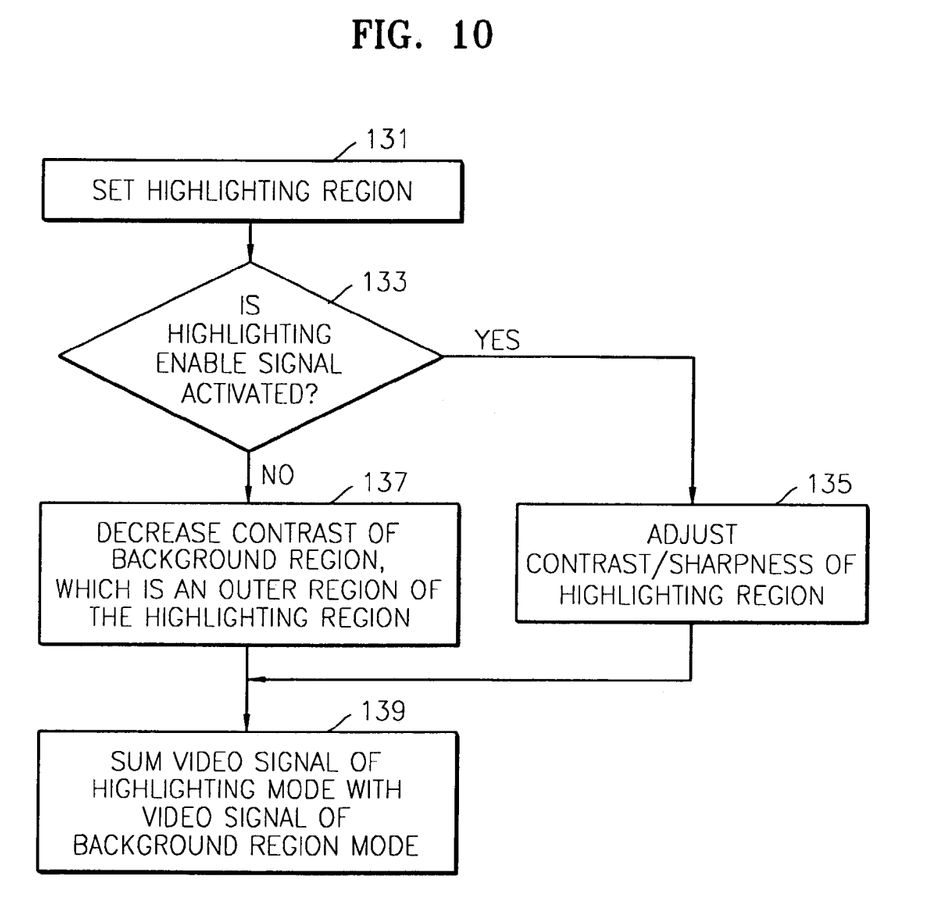
FIG. 10 is a flow diagram showing a method for adjusting the contrast in a display device according to an embodiment of the present invention.

FIG. 10 is a flow diagram of a method for adjusting the contrast of a highlighting region and a background region in a display device according to an embodiment of the present invention. Referring to FIGS. 2 and 10, in box 131, the IVP 9 receives predetermined coordinates set by the mouse 11 or generated by the OSD 23, and sets the highlighting region corresponding to the predetermined coordinates.

In box 133, the IVP 9 determines whether the highlighting enable signal IBLK1 is activated. In box 135, if the highlighting enable signal IBLK1 is activated, the IVP 9 adjusts the contrast and sharpness of the highlighting region.

That is, the contrast and sharpness of the highlighting region is adjusted in the highlighting mode responsive to the highlighting region control signals I2C_SUB and I2C_CONT1.

In box 137, if the highlighting enable signal IBLK1 is deactivated and the background enable signal IBLK2 is activated, the IVP 9 decreases the contrast of the background region, which is an outer region of the highlighting region.

That is, the contrast of the background region is adjusted in the background mode in response to the background control signal I2C_CONT2.

Thus, the method for adjusting the contrast of the background region in the background region mode according to an embodiment of the present invention can provide a video signal with high visual quality. In box 139, the IVP 9 sums the video signal of the highlighting mode with the video signal of the background region mode.

The user can select the highlighting mode or background region mode. Thus, the user can adjust the contrast and sharpness of the highlighting region using the highlighting region contrast control circuit 80 in the highlighting mode and the contrast of the background region using the background region contrast control circuit 100 in the background region mode.

While this invention has been particularly shown and described with reference to embodiments thereof, it will be understood by those skilled in the art that various changes in form and detail may be made therein without departing from the spirit and scope of the invention as defined by the claims.

We claim:

1. A method for adjusting a contrast of a background region in a display device, comprising:
   receiving a background region video signal defining a background region responsive to a background region enable signal;
   receiving a data signal distinct from the background region video signal defining a highlighting region responsive to a highlighting region enable signal where the background region is an outer region of the highlighting region;
   setting a gain of the background region video signal and independently of setting a gain of the data signal responsive to a gain control signal; and
   adjusting a contrast of the background region after setting the gain responsive to a contrast control signal.

2. The method of claim 1
   where receiving the video signal comprises receiving the video signal responsive to a a gating enable signal.

3. The method of claim 1
   where adjusting the contrast comprises decreasing the contrast of the background region relative to the highlighting region.

4. The method of claim 1 comprising displaying the video signal in the highlighting region while displaying another signal in the background region.

5. The method of claim 1 comprising generating a control signal responsive to the data signal.

6. The method of claim 5
   where receiving the data signal comprises receiving predetermined coordinates defining a highlighting region; and
   where adjusting the contrast comprises adjusting the contrast of an outer region of the highlighting region responsive to the contrast control signal.

7. The method of claim 6
   where the predetermined coordinates include top left and bottom right coordinates.

8. A method for adjusting the contrast of a background region in a display device, comprising:
   receiving predetermined coordinates;
   setting a highlighting region corresponding to the predetermined coordinates;
   receiving a video signal for a background region responsive to a background enable signal, the background region being an outer region of the highlighting region;
   setting a gain of the video signal for the background region responsive to receiving the predetermined coordinates and to a contrast control signal;

receiving a video signal for the highlighting region responsive to the highlighting enable signal; and setting a gain of the video signal for the highlighting region responsive to a highlight control signal and independently of setting the gain of the video signal for the background region.

9. The method of claim 8 where setting the gain comprises setting the gain of the video signal responsive to a gating enable signal.

10. The method of claim 8 comprising:

selecting a highlighting mode or a background region mode; and adjusting a contrast of the highlighting region responsive to a highlight control signal or a contrast of the background region responsive to the background control signal according to the selecting.

11. The method of claim 10 where adjusting the contrast comprises adjusting a sharpness of the highlighting region responsive to the highlight control signal or a sharpness of the background region responsive to the background control signal according to the selecting.

12. The method of claim 11 where adjusting the contrast of the highlighting region occurs on an active highlight enable signal; and where adjusting the contrast of the background region occurs on an active background enable signal.

13. A circuit for adjusting a contrast of a display device, comprising:

a background region;

a highlight region set by predetermined coordinates, the background region being an outer region of the highlight region;

a highlighting region contrast control circuit that receives a video signal for the highlight region responsive to a highlight enable signal and controls a gain of the video signal for the highlight region responsive to a highlight region control signal; and a background region contrast control circuit that receives a video signal for the background region responsive to a background enable signal and controls a gain of the video signal for the background region independent of the gain of the video signal for the highlighting region responsive to a background region control signal.

14. The circuit of claim 13 where the background region contrast control circuit comprises:

a switching circuit adapted to select the video signal for the background region responsive to the gating enable signal and the highlight enable signal; and a control circuit adapted to control the gain of the video signal for the background region responsive to the background region control signal.

15. A circuit for adjusting contrast, comprising:

a generating circuit to generate a highlighting enable signal responsive to a data signal, the data signal being adapted to define a highlighting region in a display region; and an amplifier circuit to adjust a gain of a video signal displayed in the highlighting region independently of adjusting a gain of a signal displayed in the display region responsive to the highlighting enable signal and the data signal;

where the generating circuit includes:

a system clock generating circuit to generate a system clock and a vertical pulse responsive to synchronization signals of the video signal;

a control register to latch the data signal responsive to the system clock and the vertical pulse;

a controller to generate the highlighting enable signal responsive to the system clock and the vertical pulse.

16. The circuit of claim 15 where the amplifier circuit includes:

a control circuit to generate a plurality of contrast control signals responsive to the data signal and the system clock;

a highlighting control circuit to adjust the gain of the video signal responsive to the plurality of contrast control signals; and a background control circuit to adjust the gain of the signal displayed in the display region responsive to a gating enable signal and the highlighting enable signal.

17. The circuit of claim 15 where the generating circuit includes:

a logic gate adapted to generate a background enable signal by logically manipulating the highlight enable signal and a gating enable signal.

* * * * *